United States Patent [19]

Jakoby

[11] Patent Number: 5,755,546

[45] Date of Patent: May 26, 1998

[54] APPARATUS FOR LOADING BILLETS AND, IF NECESSARY, PRESSING DISCS INTO HORIZONTAL METAL EXTRUSION PRESSES

[75] Inventor: Nikolaus Jakoby, Ratingen, Germany

[73] Assignee: SMS Schloemann GmbH, Germany

[21] Appl. No.: 653,511

[22] Filed: May 24, 1996

[30] Foreign Application Priority Data

May 27, 1995 [EP] European Pat. Off. ............ 95108098

[51] Int. Cl.$^6$ ...................................................... B23Q 5/22
[52] U.S. Cl. .......................................... 414/18; 414/222
[58] Field of Search ................................. 414/749, 751, 414/222, 14, 16, 17, 18, 680, 729; 198/468.2, 468.11, 721, 748; 82/126, 127, 132

[56] References Cited

U.S. PATENT DOCUMENTS

| | | |
|---|---|---|
| 2,919,039 | 12/1959 | Hess et al. |
| 4,677,838 | 7/1987 | Bessey et al. |
| 4,977,801 | 12/1990 | Fabbri ............... 414/18 X |
| 5,070,918 | 12/1991 | Pallmann |
| 5,520,493 | 5/1996 | Cucchi ................ 414/18 |
| 5,562,381 | 10/1996 | Cucchi ............. 82/127 X |

FOREIGN PATENT DOCUMENTS

| | | |
|---|---|---|
| 0 574 592 | 3/1994 | European Pat. Off. |
| 4-224015 | 8/1992 | Japan. |

*Primary Examiner*—Donald W. Underwood
*Attorney, Agent, or Firm*—DeLio & Peterson, LLC

[57] ABSTRACT

A loading shell is carried by a movable arm so that a billet to be extruded can be brought from a loading station (furnace) into line with the extrusion axis, between a billet container and a die, extrusion stem or die stem. A pusher which pushes the billet into the container is mounted, together with its displacement drive, on the carrying arm. The pusher is in the form of a carriage which is equipped with an extension and is movable along guide rails parallel to the extrusion axis. The guide rails are connected to form part of the loading shell, which part is equipped with bearings for a drive wheel, a deflection wheel and a tension wheel of a chain drive. The chain drive comprises a driving chain which is connected to the carriage and which has a width amounting to 3 to 9 times the pitch. When reversibly driven, the chain drive moves the carriage between a starting position in which its extension is outside the billet path and an end position in which the extension is flush with the container-side of the loading shell. Half of the loading shell (containing the guide rails or a lower billet support) is swivellable for lateral opening on bringing out the loading shell.

4 Claims, 8 Drawing Sheets

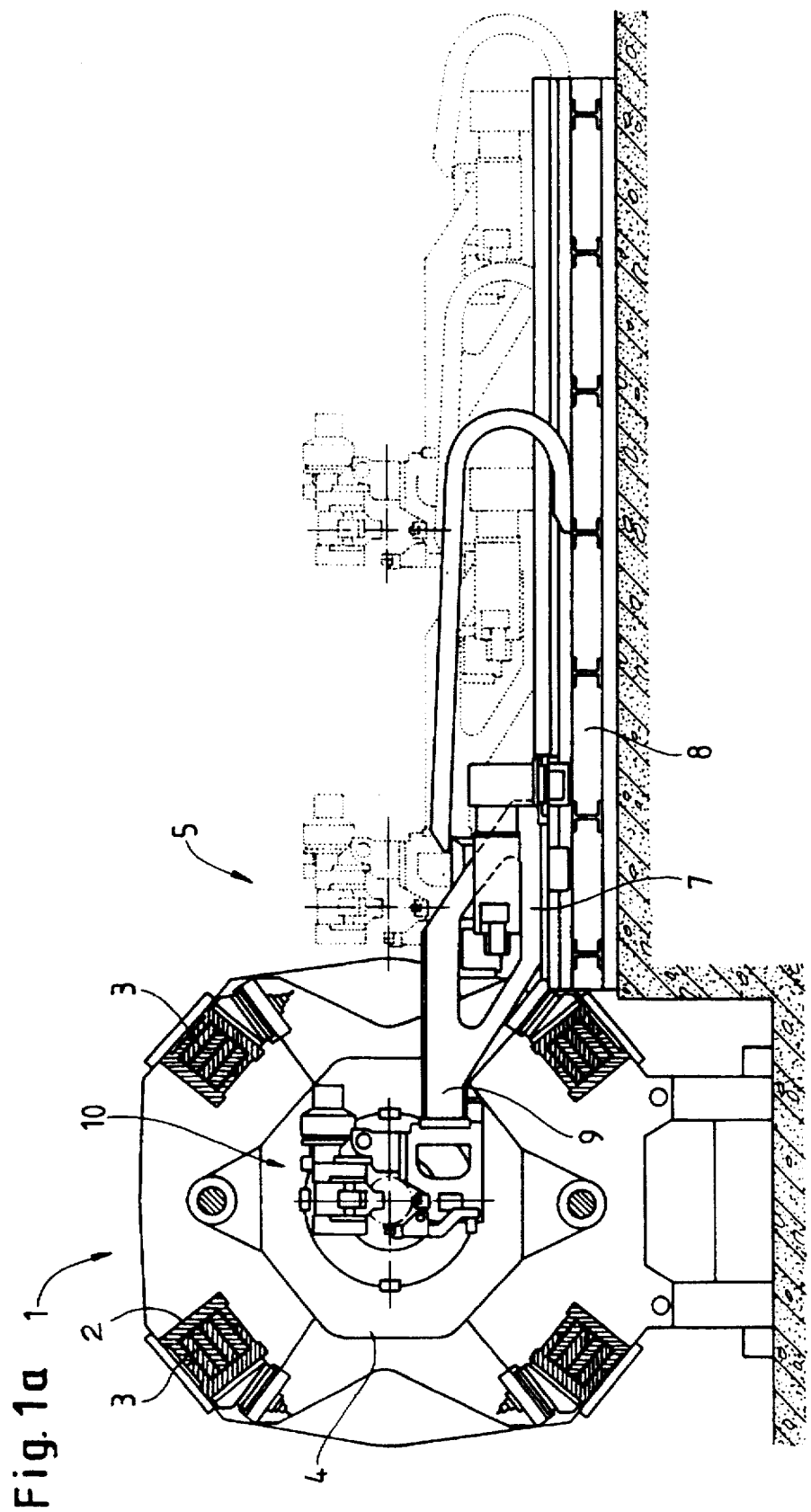

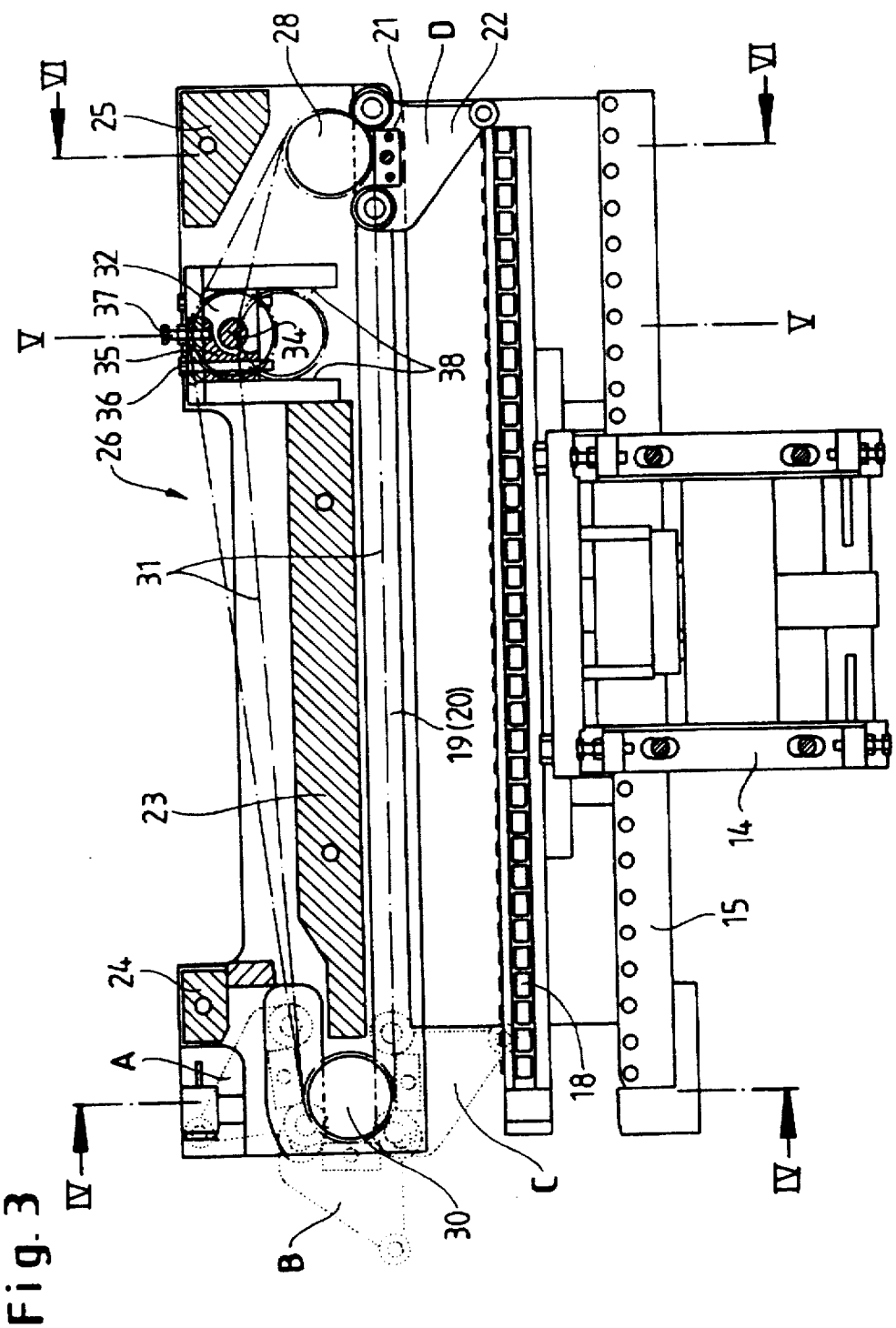

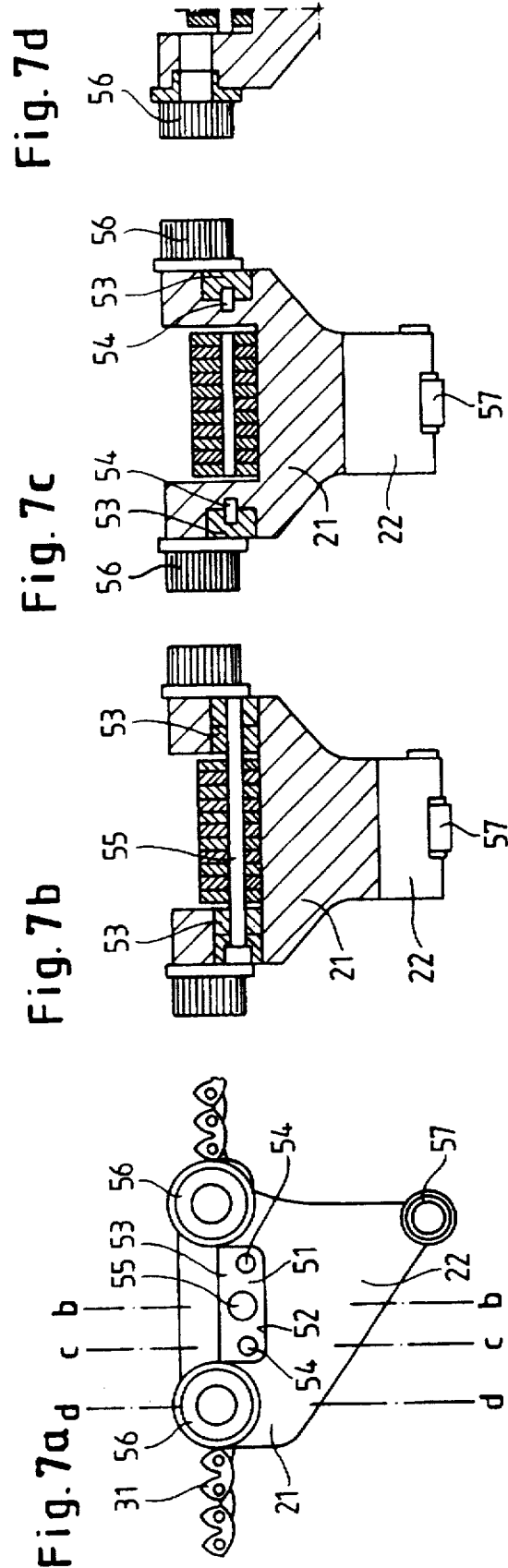

APPARATUS FOR LOADING BILLETS AND, IF NECESSARY, PRESSING DISCS INTO HORIZONTAL METAL EXTRUSION PRESSES

BACKGROUND OF THE INVENTION

The billets arriving at a metal extrusion press are brought into line with the extrusion axis by a shell- or tongs-like apparatus and then pushed, into the bore of the container, or the container is pushed over the billet. If the pushing of the billet into the container bore is not effected by the extrusion or die stem or an auxiliary ram, the loading shell is provided with a pusher which is preferably guided and mounted, together with its displacement drive, in the carrying arm of the loading shell. Loading apparatus of the latter design is known for example from U.S. Pat. No. 2,919,039 or EP 0 574 592 B1, the design of the loading apparatus having a substantial influence on whether the extrusion process proceeds trouble-free and with short down times, and on the possibility of precise measured-value acquisitions for controlling the extrusion process.

In practice, above all loading apparatuses whose pusher is constructed as a swivel arm driven by a piston/cylinder unit have proved successful until now, although such apparatuses have the disadvantage that the point of application of the pusher on the billet drifts, that they are accordingly of bulky construction and work sluggishly, and that they are not very suitable for direct measured-value acquisition. Other pusher constructions have proved less suitable on account of their space requirement, the achievable precision and speed with which the billet is pushed in, and their lower operational reliability.

SUMMARY OF THE INVENTION

The object of the invention is an apparatus for loading billets and, if necessary, pressing discs into a horizontal metal extrusion press, the apparatus being improved in respect of its operational reliability, its space requirement, and its working speed, and in the precision of its mode of operation and the associated possibility of measured-value acquisitions.

In accordance with the invention a carriage which is equipped with an extension reaching into the extrusion axis and is movable on guide rails parallel to the extrusion axis is provided as a pusher, the guide rails of the carriage are connected to form a part of a loading shell, which part is equipped with bearings for a drive wheel, a deflection wheel and a tension wheel of a chain drive; the chain drive comprises a driving chain (toothed or multiple link chain) which is connected to the carriage and is of a width amounting to 3 to 9 times the pitch, and which, when driven in reversing manner, moves the carriage between a starting position in which its extension is outside the billet path and an end position in which the front edge of the extension is flush with the container-side end face of the loading shell; and one of the halves, lying between the guide rails of the carriage and the lower billet support, of the loading shell is swivellable for lateral opening on bringing out the loading shell.

Provision may be made for a hydrostatic drive, for example a radial piston engine, as the drive for the carriage, since a hydrostatic drive motor has high output for small dimensions and damps impact loads.

To shorten down times and remedy malfunctions, the loading shell is constructed such that half of it can be opened to one side. A further improvement to the accessibility is achieved, if the upper part, combining the guide rails for the pusher carriage and the chain drive, of the loading shell is swivellable upwards about an axis arranged parallel to the loading shell's own axis to open the loading shell.

BRIEF DESCRIPTION OF THE DRAWINGS

FIG. 1a shows an extrusion press, in section, with a horizontally extendable and retractable loading apparatus shown in side view;

FIG. 3 is similar to FIG. 2 but in partial section in a vertical plane including the press axis;

FIG. 7a is a side view, of the pusher (carriage with extension) on an enlarged scale;

FIG. 7b is a section along the line b—b in FIG. 7a;

FIG. 7c is a section along the line c—c in FIG. 7a;

FIG. 7d is a portion cut out of a section along the line d—d in FIG. 7a;

FIG. 8b is plan view corresponding to FIG. 8a.

DETAILED DESCRIPTION OF PREFERRED EMBODIMENTS

Figure 1B:
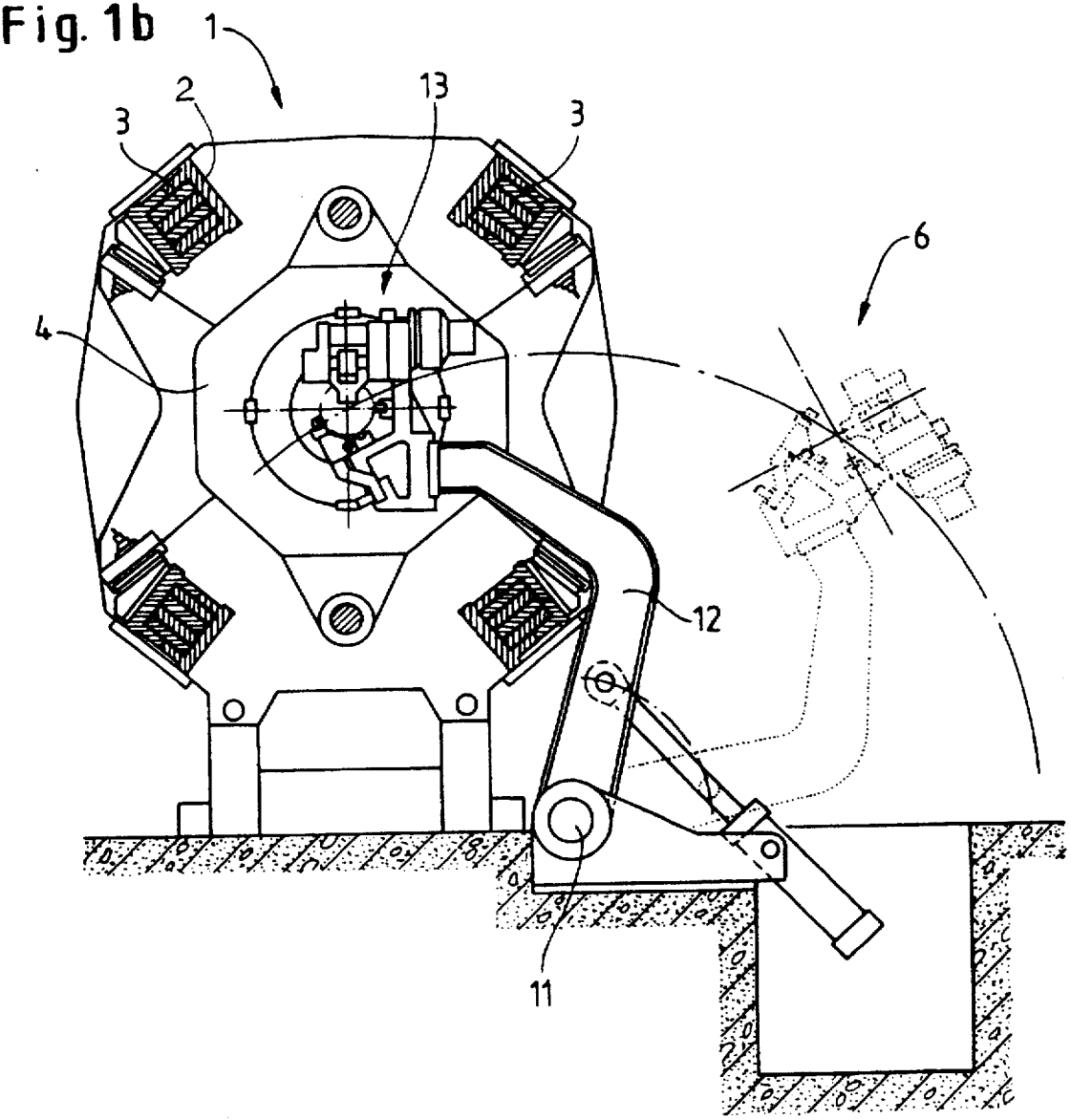
FIG. 1b shows an extrusion press, in section, with a swing-in and swing-out loading apparatus shown in side view.
Figure 2:
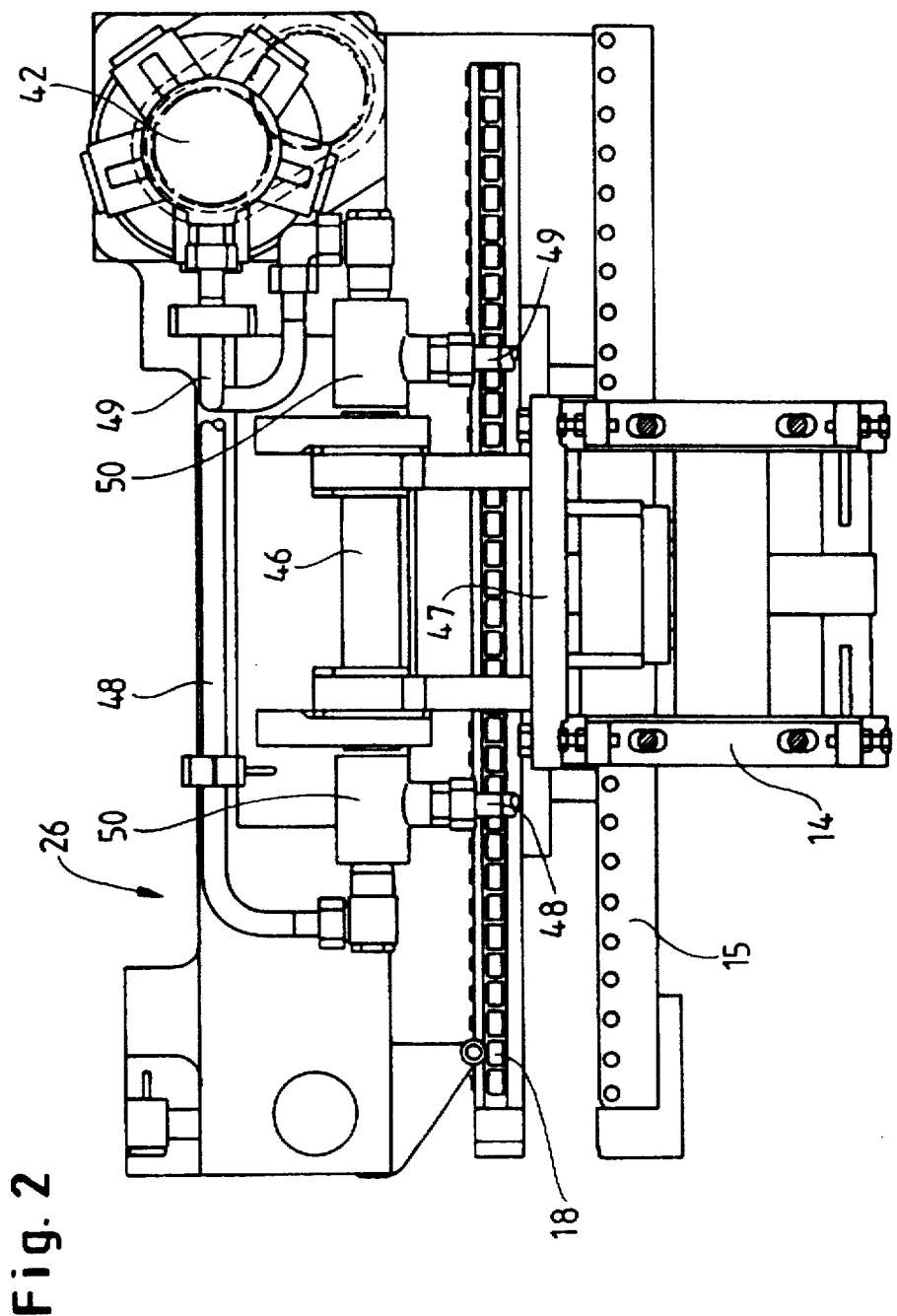
FIG. 2 shows a loading shell attached to a carrying arm of the loading apparatus according to FIG. 1a shown in side view seen from the carrying arm.

An extrusion press 1 of known construction shown in FIGS. 1a and 1b wherein the counter-crossbeam 2, the prestressed tie rods 3, and the container holder 4 can be seen in the sectional representation is provided with a horizontally extendable and retractable loading apparatus 5 in the exemplary embodiment according to FIG. 1a, and is provided with a swing-in and swing-out loading apparatus 6 in the exemplary embodiment according to FIG. 1b.

The horizontally extendable and retractable loading apparatus 5 (FIG. 1a) comprises a slide 7 which is movable on a bed 8 and carries a loading shell 10 on an arm 9. In a first position, shown in solid lines in FIG. 1a, the slide 7 is in one end position, in which the loading shell 10 is on the press axis. In a second position, shown in dotted lines in FIG. 1a, the slide 7 is in the other end position, in which the loading shell 10 is on the furnace axis. An intermediate position is provided as a waiting position and/or for the sooting of the billet end face, for the inspection of the billet, the bringing into place of the pusher for the billet advance, the determination of the respective billet length, and suchlike auxiliary operations.

The swing-in and swing-out loading apparatus (FIG. 1b) comprises an arm 12 which is swivellable about a shaft 11 and carries a loading shell 13. In one position, shown in solid lines in FIG. 1b, the swivel arm 12 is in one end position, in which the loading shell 13 is on the press axis. In the second position, shown in dotted lines in FIG. 1b, the swivel arm 12 is in the other end position, in which the loading shell is on the furnace axis. The swivel arm 12, with its loading shell 13, may be arranged, if necessary, to stop in an intermediate position.

The loading shells 10 and 13 are of fundamentally the same design and are merely adapted to the different movement path—rectilinear according to FIG. 1a and circular-arcuate according to FIG. 1b.

From FIGS. 2 to 6, the structure of a loading shell 10 is evident. It comprises a carrier 14 attached to the arm 9 and, releasably connected thereto, a roller path 15 as a lower support for a billet 16 to be transported by the loading shell 10, a lateral support 17, and a roller path 18 as a second lateral support. The upper border of the loading shell 10 is formed by guide rails 19 and 20 for a pusher, comprising a carriage 21 with extension 22, for advancing the billet 16. The guide rails 19 and 20 are connected by crosspieces 23, 24, and 25 to form a bearing body 26 in which in bearings 27 a drive-chain wheel 28 is mounted and in bearings 29 a deflection wheel 30 is mounted, for a chain 31 which moves the carriage 21. The chain 31 is tensioned by a tension wheel 32 which is carried by means of bearings 33 by an axle 34 carried by sliding pieces 35, the sliding pieces 35 being adjustable and lockable in sliding paths 38 by adjusting screws 36 and locking screws 37. The drive-chain wheel 28 is carried by a shaft 39 and connected by the latter, in such a manner as to be fixed in terms of rotation, to a pinion 40 which is in mesh with a pinion 41 on the output shaft of a hydraulic motor 42. As is evident from FIG. 3, the carriage 21 is moved to and fro by the reversing hydraulic motor 42 between its starting position A, (shown in dotted lines) above the deflection wheel 30, via intermediate positions B and C (likewise shown in dotted lines), and its end position D below the drive-chain wheel 28.

Figure 4B:
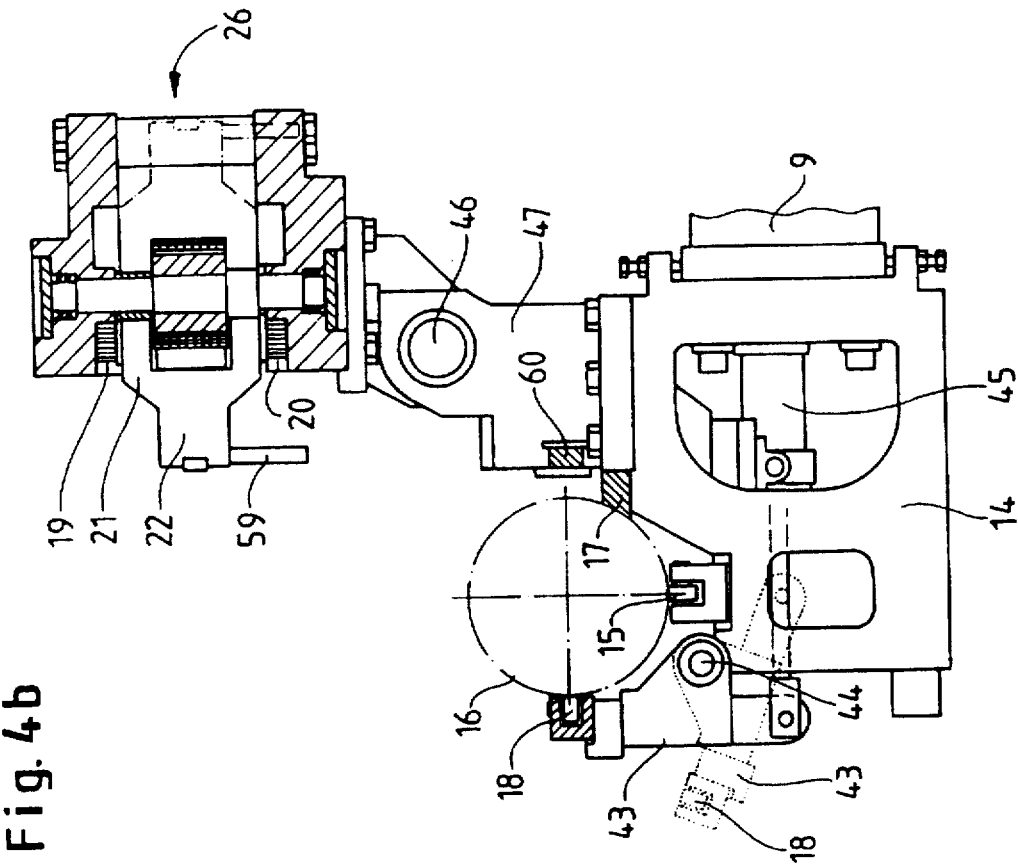
FIG. 4b is similar to FIG. 4a but with a swung-out loading-shell part.
Figure 4A:
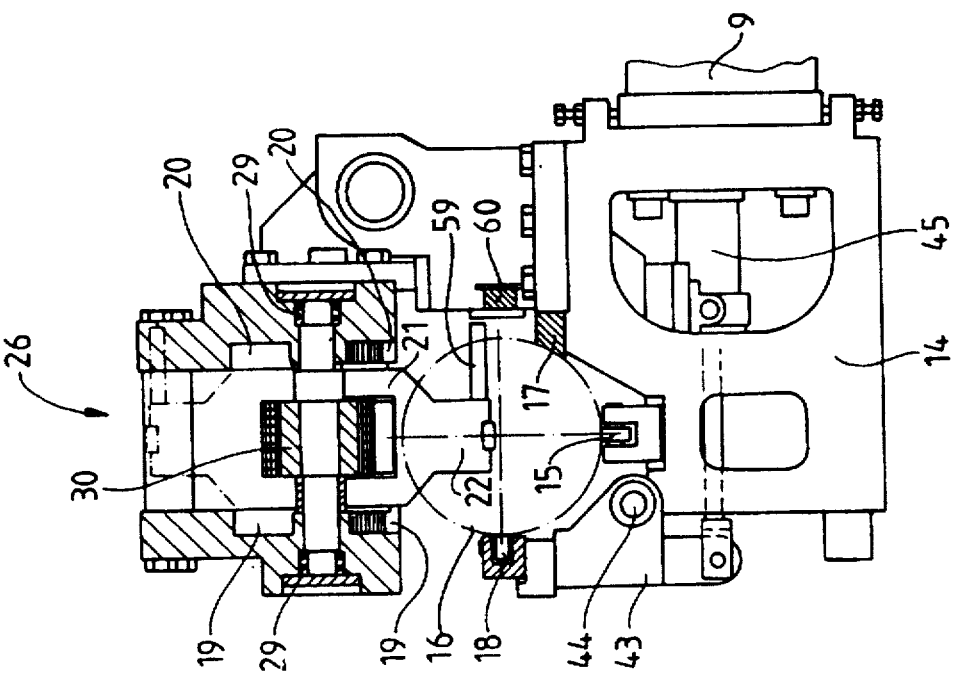
FIG. 4a is a front view partially sectioned along the line IV—IV in FIG. 3.

As is evident from FIGS. 4a and 4b, the roller path 15 is connected to the carrier 14 in such a manner as to be adjustable in height and alignable parallel to the press axis. The lateral support 17 is releasably, and thus adjustably and interchangeably, connected to the carrier 14. The roller path 18 is connected to the carrier 14 by swivel lever 43, the swivel lever 43 being able to be swung in and out about shafts 44 by means of piston/cylinder units 45 and thus the loading shell 10 being able to be laterally opened in order, for example, to use the extrusion stem to follow the pusher into the loading shell 10 for the purpose of shortening down times, or in the event of a billet getting stuck when not yet fully introduced into the container bore. In order to be able to open the loading shell 10 in the event of a malfunction not only laterally but further, the bearing body 26, equipped with the guide rails 19 and 20, is swivellable about a shaft 46 in a bracket 47 with respect to the carrier 14. The lines 48 and 49 to the hydraulic motor 42 are equipped with rotary couplings 50 in the shaft 46 for this purpose, as is evident from FIG. 2.

In FIGS. 7a to 7d, the carriage 21 with its extension 22 and with the toothed chain 31 connected to it is shown. To connect the toothed chain 31 to the carriage 21, a series of the mutually adjacent toothed-chain links are equipped with side-plates 51 seated in a groove 52 in the carriage 21. Placed on both sides of the side-plates 51 is a locking piece 53. The locking pieces 53 are seated in the groove 52, which is widened at the ends, and are arrested there by pins 54. A screw 55 is used to join together the side-plates 51 of the toothed-chain links and the locking pieces 53 and connect them to the carriage 21. The carriage 21 is equipped with wheels 56 which run in the guide rails 19 and 20 of the bearing body 26. The numeral 57 denotes a pressure roller in the extension 22, with which the extension 22 is laid against the billet 16.

Figure 8A:
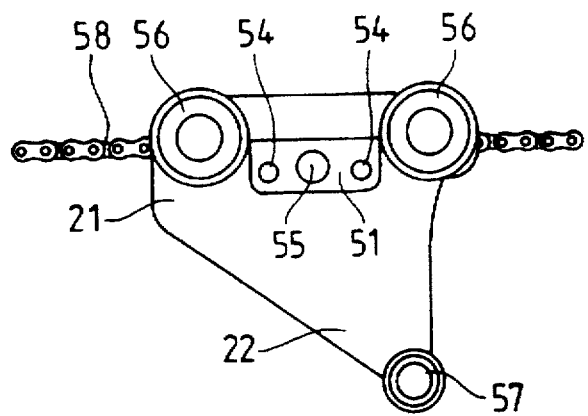
FIG. 8a is a side view of a modified embodiment of the pusher.
Figure 8B:
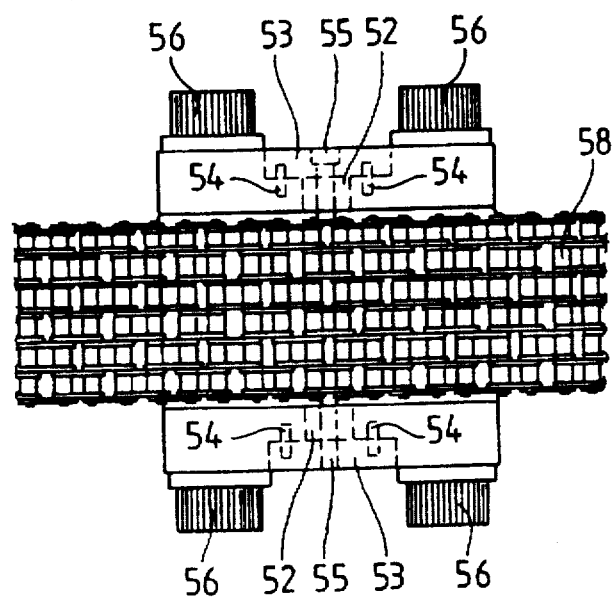

FIGS. 8a and 8b show a sextuple link chain 58 instead of a toothed chain 31, the form of connection to the carriage 21 being otherwise the same. Both the chains 31 and 58 have a width which is in the range of 3 to 9 times the pitch.

Figure 6:
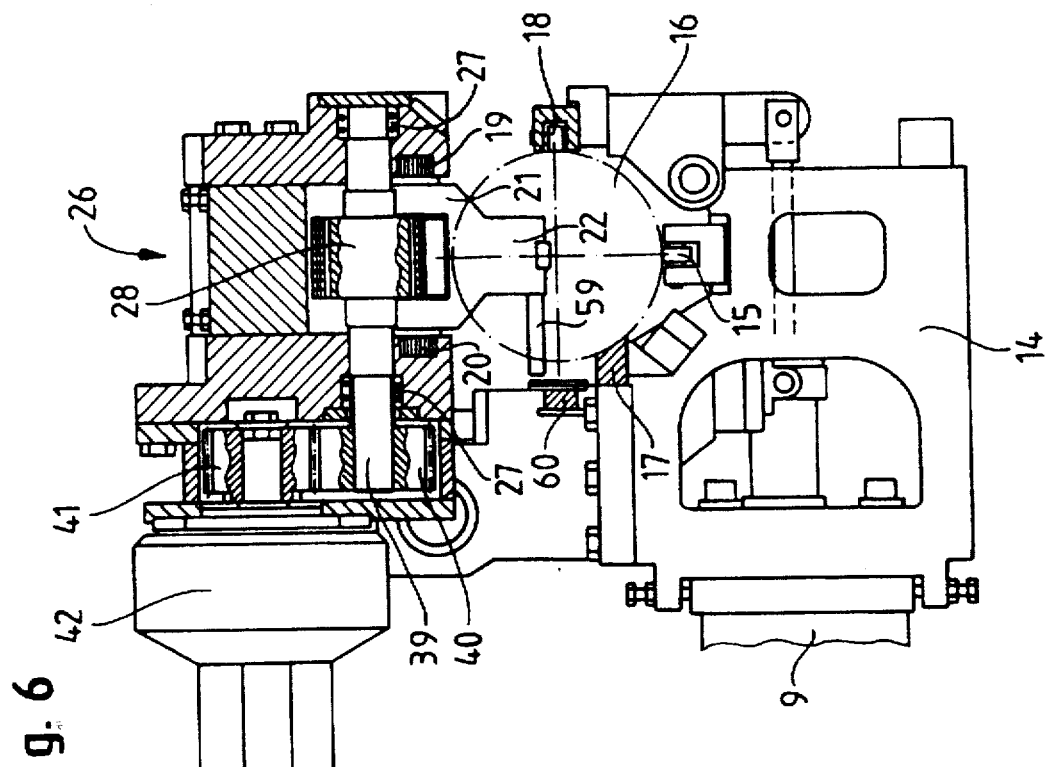
FIG. 6 is a section along the line VI—VI in FIG. 3.
Figure 5:
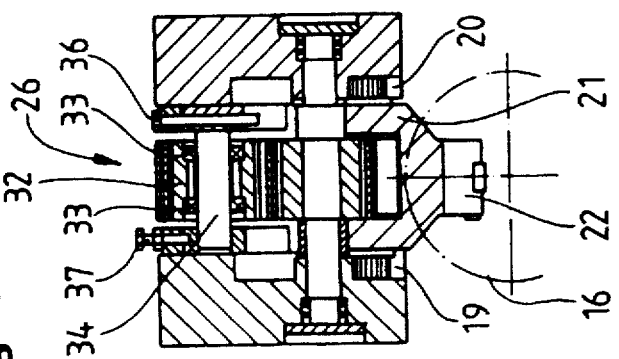
FIG. 5 is a section along the line V—V in FIG. 3 (only the upper part)

The measured-value acquisition can be effected directly and/or indirectly, absolutely and/or incrementally. To this end, provision is made for a sensor for angles of rotation, which is coupled to the shaft of the drive motor 42, for measurement of the oil pressure or the pressure difference when using a hydraulic motor or the current intensity when using an electric motor as the drive motor 42, and—as FIGS. 4a, 4b and 6 show—provision is made for an arm 59 which is connected to the carriage 21 and cooperates with position indicators or displacement sensors on a beam 60 connected to the carrier 14 via the bracket 47.

The reaction to the force required to push in a billet 16 at the pusher is absorbed by the arm 9, the slide 7 and the bed 8 (exemplary embodiment according to FIG. 1a), and by the swivel arm 12 and its support by means of the shaft 11 (exemplary embodiment according to FIG. 1b). Excessive stressing of these components in the event of a malfunction, for example a billet 16 jamming in the container bore, is prevented, since the pushing-in force is monitored and limited by measurement of the oil pressure or the pressure difference at the motor 42. The monitoring and limiting of the pushing-in force is to be provided for in all cases to prevent severe jamming of the billet 16 and "mushrooming" of the billet part outside the container, even if the absorption of the reaction force takes place inside the press, as may be provided for in modifications (not shown) of the exemplary embodiments. It is thus possible to support the loading shell 10 or 13 on the moving crosshead of the press or to attach it to the container holder 4 in a tension-proof manner by a clamp component with a mating component on the container holder 4 and loading shell 10 or 13. Furthermore, means for locking with respect to the press frame are possible, which— if not directly absorbing the reaction force—produce a point of support closer to the line of the reaction force.

In summary, the apparatus for loading billets (16) and, if necessary, pressing discs into a horizontal metal extrusion press (1), comprises a loading shell (10, 13) which is carried by a movable arm (9, 12) and with which a billet (16) to be extruded can be brought from a loading station (furnace) into line with the extrusion axis between container and die, extrusion stem or die stem, and a pusher which pushes the billet (16) into the container bore and is mounted, together with its displacement drive, in the carrying arm, wherein a carriage (21) which is equipped with an extension (22) reaching into the extrusion axis and is movable in guide rails (19, 20) parallel to the extrusion axis is provided as the pusher, the guide rails (19, 20) are connected to form a part (26) of the loading shell (10, 13), which part is equipped with bearings for a drive wheel (28), a deflection wheel (30) and a tension wheel (32) of a chain drive, the chain drive comprises a driving chain (toothed chain 31 or multiple link chain 58) which is connected to the carriage (21) and is of a width amounting to 3 to 9 times the pitch, and which, when driven in reversing manner (42), moves the carriage (21) between a starting position (A) in which its extension (22) is outside the billet path and an end position (D) in which the front edge of the extension is flush with the container-side end face of the loading shell, and in that one of the halves, lying between the guide rails (19, 20) of the carriage (21) and the lower billet support (15), of the loading shell (10, 13) is swivellable for lateral opening on bringing out the loading shell (10, 13).

I claim:

1. Apparatus for loading billets into a horizontal metal extrusion press having an extrusion axis, the apparatus comprising:

a loading shell for receiving a billet on a billet path;

a transversely movable arm which carries the loading shell at an end thereof, the arm being movable to move the loading shell transversely to the extrusion axis between a first position, in which a billet received by the loading shell lies on the extrusion axis, in use, and a second position in which the loading shell is clear of the extrusion axis;

a pusher mounted on the movable arm for pushing the billet into a billet container, the pusher comprising a carriage having an extension;

the loading shell including guide rails along which the carriage is guided for movement parallel to the extrusion axis the guide rails being mounted with the loading shell on the movable arm;

a driving chain connected to the carriage, the chain passing over wheels, one of which is a drive wheel, rotatably mounted on the loading shell, the chain having a given pitch and a width which is 3 to 9 times the pitch, the chain being reversibly drivable to move the carriage between a starting position, in which the extension is outside the billet path, and an end position, in which the extension is substantially flush with one end of the loading shell;

the loading shell, the pusher, the guide rails, the carriage, the extension, the drive wheel and the chain being carried as a whole on the movable arm for transverse movement relative to the extrusion axis, said whole being entirely clear of the extrusion axis when the movable arm moves to the second position;

the loading shell having two longitudinal parts, one of which is swivellable relative to the other for lateral opening of the loading shell.

2. Apparatus according to claim 1, wherein said two longitudinal parts include, on one hand, said guide rails and, on the other hand, a billet support.

3. Apparatus according to claim 1, wherein an upper part including said guide rails and said chain, of the loading shell is swivellable upwards about a longitudinal axis to open the loading shell.

4. Apparatus according to claim 1, including a reversible hydrostatic drive for driving said chain.

* * * * *